Patented Jan. 6, 1953

2,624,514

UNITED STATES PATENT OFFICE 2,624,514

GRINDING OF THERMOSETTING AMINO-PLASTIC GRANULAR MOLDING COMPOSITIONS

Vladimir J. Wilhousky, New Brunswick, N. J., assignor to American Cyanamid Company, New York, N. Y., a corporation of Maine No Drawing. Application September 30, 1949, Serial No. 119,016

6 Claims. (Cl. 241—3)

This invention relates to a process for the manufacture of thermosetting aminoplastic molding compositions in granular form, and more particularly, to a continuous process for making such compositions. The invention is especially adapted to the manufacture of urea-formaldehyde and melamine-formaldehyde molding compositions.

Heretofore, aminoplastic molding compositions have been made in granular form by densifying an aminoplastic resin molding powder in a Banbury mixer, and the resulting material is then granulated in a revolving blade cutter. The resulting granular material may be readily handled since it is a free-flowing, non-dusty material. It is readily pressed into preforms, or it may be molded directly, if desired. This process is, of course, a batch operation since only a small amount of the aminoplast powder can be charged into the Banbury mixer at one time. This results in a product which is frequently non-uniform, and it requires a considerable amount of labor.

Another method of making granular material has been used with limited success. This involves heating an aminoplast molding powder on hot rolls and forming a sheet of the heated powder by passing the powder through pressure rolls. Thereafter the sheeted material is stripped from the rolls and granulated in a rotary blade cutter. In this process the powder may be heated either on the same or a different set of rolls, and in fact, may even be heated by other means. The disadvantage of this process is that the aminoplast powder is not uniformly heated, and the product is, therefore, not uniform. Furthermore, because of the difference in density of the powder at various points on the rolls, a different degree of compression is obtained. Aside from these difficulties, the most serious one is that the sheet coming from the rolls has a very high ratio of surface area to volume. All of this surface material is more highly densified and/or more highly polymerized than the interior material. The result is that the granular molding powders produced from such a sheet frequently give moldings having a non-uniform appearance, sometimes called an "orange peel" surface. Attempts to overcome this by increasing the thickness of the sheet and decreasing the pressure applied to the rolls generally result in failure because the material either fails to sheet properly or is not properly densified.

From the foregoing it can be seen that it would be desirable to have a substantially continuous process of making a granular aminoplastic molding composition which would avoid the difficulties encountered by the use of the previously known methods. It is, therefore, an object of the present invention to provide a process for the manufacture of granular molding compositions which is continuous and which avoids the difficulties encountered in the use of the batch process, wherein the Banbury mixer is used, and which also avoids the difficulties encountered in the operation of, as well as in the product obtained by, the heated roll method.

This and other objects are attained by heating a finely ground aminoplast molding powder while maintaining it in a loose, un-compacted condition and preferably with agitation to a temperature of about 45–80° C., feeding the heated powder directly into a briquetting machine and forming briquettes under a pressure of 5,000–25,000 pounds per square inch, said briquettes having a ratio of area to volume of less than 10:1, immediately granulating the resulting briquettes while hot to form a granular material, the particles of which are small enough to pass through a 10-standard mesh screen and the major portion of which will not pass through an 80-standard mesh screen, and thereafter cooling the granular material to a temperature below 45° C.

The following examples, in which the proportions are in parts by weight, are given by way of illustration, but not in limitation. The aqueous formaldehyde used in each case is the commercial product which is an aqueous solution containing 37% of formaldehyde.

EXAMPLE 1

A molding powder, e. g., powder "A," is charged continuously into a suitable heater, such as a jacketed revolving kiln, and heated to about 70–70° C. The heat may be supplied by any desired heating medium, such as oil, which may be circulated through the jacket of the heater at, for example, 90–120° C. The powder must be agitated sufficiently during the heating process to obtain as uniform heating as possible and to prevent any local overheating. Furthermore, the powder should be agitated to keep it in a loose, uncompacted condition. The heated powder is fed directly from the heater into an automatic briquetting machine to produce highly compacted briquettes about 9" x 5" x ¾". The briquetting machine may be of the mechanical or hydraulic type, and is desirably operated at pressures of 5,000–12,000 pounds per square inch. The briquettes are dropped directly into a granulator, such as the conventional revolving blade cutter used in granulating aminoplasts. The granular material is cooled to a temperature below 45° C., preferably 25–35° C. This may be done by passing the granular material over a water-cooled table. It is screened to remove fines smaller than 80 mesh which are returned to the process prior to the heating of the powder for reworking. A small amount of mold lubricant may be incorporated into the granular material and intimately mixed therewith, if desired. The granular molding compound thus obtained may be readily preformed or it may be molded directly. In either case, molding having good gloss and a smooth surface finish are obtained. Furthermore, the product is uniform, and thus the molder is able to operate continuously without difficulty once the proper molding conditions and amount of the granular material required are determined.

EXAMPLE 2

A molding powder, e. g., powder "A," is charged continuously into a heater which is jacketed and which has a ribbon-blender type agitator revolving therein. The heater may be heated with a heat exchange medium, such as oil, circulating through the jacket at about 120–125° C. The powder is not allowed to more than half fill the heater in order that it does not become compacted. The agitator is revolved sufficiently rapidly to keep the powder in a loose condition, and to mix it thoroughly to obtain uniform heating and to avoid local overheating. The heater is designed to produce powder heated to about 60° C. The heated powder is fed directly to a briquetting machine to produce highly compacted briquettes 3½" x 7" x ⅝". The pressure of the briquetting is desirably about 10,000 pounds per square inch. Highly uniform, well compacted briquettes are produced and fed directly into a granulator of the conventional revolving blade type of cutter. The granular material is screened to remove particles finer than 80 mesh and those larger than 8–10 mesh. The fines which are not allowed to go into the final product are returned to the process for reworking. Moldings of granular materials produced according to this example are uniform, and have smooth, glossy surfaces.

EXAMPLE 3

A molding powder, e. g., powder "B," is processed in the same ways as set forth in Examples 1 and 2. In each case, granular molding compounds having excellent properties are obtained. Moldings thereof have good gloss and are uniform in appearance.

EXAMPLE 4

A molding powder, e. g., powder "A," powder "B" or mixtures of powder "A" and powder "B" (such as a mixture of one part of powder "A" and one part of powder "B"), is processed in accordance with the process of Example 1, except that the briquettes are about 4" x 2" x ¾" in size. Good moldings are obtained from granular molding compounds thus obtained.

EXAMPLE 5

A molding powder, e. g., powder "A," powder "B" or mixtures of powder "A" and powder "B" (such as a mixture of four parts of powder "A" and one part of powder "B"), is processed in accordance with Example 2, except that the briquettes are about circular discs, about 1" in diameter and about ⅜" thick. Good moldings are obtained and uniformly so from granular molding compounds thus obtained.

Preparation of powder "A"

60 parts of urea are added to 116 parts of aqueous formaldehyde after adjusting the pH of the latter to about 10 with triethanolamine and after raising the temperature to about 27–30° C. The reaction mixture is then heated at about 30–32° C. for 1–3 hours. The resulting syrup is filtered and mixed with about 66–68 parts of alpha cellulose pulp, and then dried in a continuous dryer at a temperature of about 80–95° C. for 1–2 hours and then cooled. The resulting dried material is charged into a ball mill along with the desired amounts of lubricant, curing agent and color, if necessary. The charge is maintained at about 25–30° C. during the ball-milling operation, and after sufficiently uniform, i. e., after 10–20 hours, the powder is discharged and screened. The resulting powder is quite fine, fluffy and difficult to handle.

Preparation of powder "B"

126 parts of melamine are charged to a reactor containing about 162 parts of aqueous formaldehyde, and the pH is adjusted to about 7.5–8.5 with sodium hydroxide. The reaction mixture is heated to reflux over a period of about ½ hour and refluxed for about ¼–¾ hour. The resulting syrup is cooled to about 60° C. and filtered. It is then mixed with about 80 parts of alpha cellulose pulp, and dried in a continuous dryer at about 75–80° C. for 1–2 hours and then cooled. The dried material is charged into a ball mill, together with mold lubricant, curing catalyst and color, if desired, in suitable amounts for the intended use of the material. It is ground in the mill at about 25–30° C. for 10–20 hours, discharged and screened. A fine, fluffy powder is obtained.

The present invention is applicable to any thermosetting aminoplast resin, and includes the aminotriazine-aldehyde resins (such as melamine - formaldehyde resins, benzoguanamine-formaldehyde resins, acetoguanamine-formaldehyde resins, etc.), dicyandiamide-aldehyde resins, urea-formaldehyde resins, mixed melamine-urea-formaldehyde resins, mixed thiourea-urea-formaldehyde resins, mixed dicyandiamide-melamine-formaldehyde resins, etc. In the manufacture of the molding powders, various curing catalysts may be incorporated, such as those normally used in the art. These include acids, such as phthalic acid or phthalic anhydride, maleic acid, etc. Furthermore, salts may be used, such as diammonium phosphate, triethanolamine phthalate, etc. Any of the compositions may be buffered with alkaline materials, such as free urea, melamine or hexamethylene tetramine. Suitable mold lubricants may be incorporated in the compositions, such as zinc stearate, calcium stearate, etc.

Generally, I prefer to use alpha cellulose pulp as the filler, but various other fillers may be used if desired, including wood flour, paper fibers, cotton fibers, asbestos fibers, nylon fibers, glass fibers, etc. Aside from using fibers as such, they may be used in woven form or in the form of spun threads. In such cases the fabrics or threads are generally cut in relatively small pieces.

The molding compositions may contain any suitable dyes or pigments in order to obtain various colors, ranging from the pastel colors to black.

While I have described certain types of heaters for heating the aminoplast molding powders in accordance with my process, this may be accomplished by any desirable means so long as the powder is maintained in an uncompacted condition during the heating, and the powder should preferably be agitated during the heating process in order to avoid local overheating and in order to heat all of the powder uniformly up to the desired temperature.

The powder should be heated to a temperature of about 45–80° C. For optimum results the temperature should be in the neighborhood of 70° C., and therefore, my preferred range is from about 70 to 80° C. Attention is called to the fact that the heated powder should be fed directly into a briquetting machine so that it will not cool off or become non-uniform in temperature before the briquetting process takes place.

The briquetting machine should be operated at as high pressures as possible in order to form well densified and uniform briquettes. Thus, I prefer to use pressures between about 10,000 pounds per square inch and 15,000 pounds per square inch, although pressures as low as 5,000 pounds per square inch or as high as 25,000 pounds per square inch may be used if desired.

The size of the briquettes is of extreme importance, and they should be as large as possible, consistent with production requirements and the design of the briquetting machines. In no event should the ratio of area to volume be more than 10:1. Actually, it is preferable that the ratio be even much less than 10:1, i. e., less than 6:1. The previously used methods of producing sheeted materials result in a product having a ratio of area to volume of as much as 400% of the maximum which is permissible in accordance with my invention. It can thus readily be seen that I am able to obtain a much more uniformly densified material, and test results have shown that moldings produced in accordance with my process have far superior surfaces than those made from molding materials produced by other known methods.

In order to operate my process with the formation of the minimum amount of fines, and in fact, in order to obtain substantially all of the material in granular form, the briquettes should be granulated while hot, or in other words, immediately after they are ejected from the briquetting machine. If allowed to cool, the briquettes will be granulated back to form a high proportion of powder. If the briquettes are granulated while hot, a very small amount of fines will be obtained. The conventional revolving blade cutter is the most desirable for this purpose, although any suitable apparatus may be used. The material is granulated so that it will pass through a 10-standard mesh screen, but so that the major portion will not pass through an 80-standard mesh screen. While anything over 50% is a major portion, actually it is preferable that the amount which will not pass through an 80-mesh screen be about 75–90%. For some purposes, a small amount of material finer than 80 mesh is desirable to give certain flow characteristics, whereas in other cases, it may be desirable to have a product none of which will pass through an 80-mesh screen. After passing through the granulator, the product may be screened in order to adjust the proportion of material finer than 80 mesh. Any material removed may be returned to the process prior to the densifying stage for reprocessing.

It may be desirable to carry out some of the steps of my process in two or more steps. Thus, the powder may be heated in two or more stages, for example, in the first stage to 45–50° C., and in the second stage to 55–80° C. Similarly, the granulating may be done in a plurality of stages. Thus, the briquettes may be broken into relatively large pieces by a crusher or cutter, and then the pieces obtained from this are fed to a revolving cutter granulator to produce the final granular material.

The granular molding materials produced in accordance with the present invention have a wide range of application since good surface effects are obtained on all types of molded articles, including clock cases, radio cabinets, dishes, trays, etc.

I claim:

1. A process which comprises heating a finely ground thermosetting aminoplast molding powder while maintaining it in a loose, uncompacted condition to a temperature of about 45–80° C., feeding the heated powder directly into a briquetting machine and forming briquettes under a pressure of 5,000–25,000 pounds per square inch, said briquettes being of such a size that they have a ratio of area to volume of less than 10:1, immediately granulating the resulting briquettes while hot to form a granular material, the particles of which are small enough to pass through a 10-mesh screen and the major portion of which will not pass through an 80-mesh screen.

2. A process which comprises heating a finely ground thermosetting aminoplast molding powder while maintaining it in a loose, uncompacted condition and with agitation to a temperature of about 45–80° C., feeding the heated powder directly into a briquetting machine and forming briquettes under a pressure of 5,000–25,000 pounds per square inch, said briquettes having a ratio of area to volume of less than 10:1, immediately granulating the resulting briquettes while hot to form a granular material, the particles of which are small enough to pass through a 10-mesh screen and the major portion of which will not pass through an 80-mesh screen and cooling the granular material to a temperature below 45° C.

3. A process which comprises heating a finely ground thermosetting aminoplast molding powder while maintaining it in a loose, uncompacted condition and with agitation to a temperature of about 45–80° C., feeding the heated powder directly into a briquetting machine and forming briquettes under a pressure of about 10,000–15,000 pounds per square inch, said briquettes having a ratio of area to volume of less than 10:1, immediately granulating the resulting briquettes while hot to form a granular material, the particles of which are small enough to pass through a 10-mesh screen and the major portion of which will not pass through an 80-mesh screen and cooling the resulting granular material to a temperature below 45° C.

4. A process which comprises heating a finely ground thermosetting aminoplast molding powder while maintaining it in a loose, uncompacted condition and with agitation to a temperature of about 70–80° C., feeding the heated powder directly into a briquetting machine and forming briquettes under a pressure of about 10,000–15,000 pounds per square inch, said briquettes having a ratio of area to volume of less than 6:1, immediately granulating the resulting briquettes while hot to form a granular material, the particles of which are small enough to pass through a 10- mesh screen and the major portion of which will not pass through an 80-mesh screen and cooling the resulting granular material to a temperature below 45° C.

5. A process as in claim 3 wherein the aminoplast molding powder is a urea-formaldehyde resin molding powder.

6. A process as in claim 3 wherein the aminoplast molding powder is a melamine-formaldehyde resin molding powder.

VLADIMIR J. WILHOUSKY.

REFERENCES CITED

The following references are of record in the file of this patent:

UNITED STATES PATENTS

| Number | Name | Date |
|---|---|---|
| 2,143,413 | Ellis, Jr. | Jan. 10, 1939 |
| 2,297,505 | Schmidberger | Sept. 29, 1942 |
| 2,319,040 | Conklin | May 11, 1943 |
| 2,316,283 | Piperoux et al. | Apr. 13, 1943 |
| 2,436,771 | Hood | Feb. 24, 1948 |
| 2,461,089 | Smidth | Feb. 8, 1949 |
| 2,464,746 | Gering | Mar. 15, 1949 |